United States Patent Office 3,066,131
Patented Nov. 27, 1962

3,066,131
ETHYLENE POLYMERIZATION PROCESS
Harmon M. Knight, La Marque, and Joe T. Kelly, Dickinson, Tex., assignors, by mesne assignments, to Standard Oil Company, Chicago, Ill., a corporation of Indiana
No Drawing. Filed Feb. 7, 1958, Ser. No. 713,787
8 Claims. (Cl. 260—94.9)

This is a continuation-in-part of our copending applications Serial No. 581,496, filed April 30, 1956, Serial No. 581,506, filed April 30, 1956, Serial No. 586,409, filed May 22, 1956, Serial No. 586,410, filed May 22, 1956, Serial No. 586,582, filed May 22, 1956, Serial No. 586,611, filed May 22, 1956, Serial No. 591,040, filed June 13, 1956, Serial No. 591,224, filed June 13, 1956 and Serial No. 597,918, filed July 16, 1956, now U.S. Patents Numbers 2,824,150, 2,824,151, 2,824,153, 2,824,154, 2,824,155, 2,824,156, 2,824,158, 2,824,160, 2,824,146 respectively.

This invention relates to the polymerization of ethylene to liquid and solid polymeric materials.

Ethylene is converted to polymers which are liquids, solids or a mixture thereof by contact with a catalyst system consisting essentially of boron trifluoride and a mercury salt of an inorganic acid. The ethylene may be contacted with the catalyst system alone or in admixture with inert hydrocarbons such as butanes, pentanes and hexanes. For ease in removing the polymeric material from the reaction zone and the recovery of the polymeric material it is preferred to operate with a low boiling material such as butane.

The catalyst system utilized in the instant invention consists of two components, one component is boron trifluoride and the other component is a mercury salt of an inorganic acid. The salts may be either anhydrous or contain water of hydration. The process requires that free $BF_3$ be present in the reaction zone. The salts tend to tie up some of the $BF_3$ and therefore $BF_3$ should be present in an amount greater than that which it tied up by the salt. When a hydrated salt is used as the co-catalyst about 1 mol of $BF_3$ is taken up by the hydrate per mol of hydrate water present if allowed sufficient contact time. Adsorbed moisture will also tie up $BF_3$. Thus more than the amount of $BF_3$ which will be taken up by the salt must be charged to the reaction zone in order to insure the existence of the two component catalyst system.

Polymerization takes place readily upon contact of the ethylene with the salt and $BF_3$. The product of the polymerization is typically a mixture of liquid polymeric material boiling above about 150° C. and solid material. The solid or semi-solid material tends to coat the particles of salt present in the reaction zone and "deactivates" the catalyst system. In general the weight ratio of ethylene to mercuric salt in the reaction zone is between about 1 and 10. Although only a small amount of free $BF_3$ is necessary to obtain the beneficial co-catalytic result, larger amounts have a beneficial effect on the rate of polymerization. In general processes operate with a weight ratio of ethylene charged to free $BF_3$ present in the reaction zone of between about 1 and 100.

$BF_3$ is not an ethylene polymerization catalyst of any consequence and the $BF_3$ and ethylene may be premixed and introduced together into the reaction zone containing the defined salt. Or the ethylene may be introduced into the reaction zone containing the complete catalyst system.

The process is operable at temperatures lower than the cracking temperature of the polymeric product. In general the process is carried out at temperatures between about 0° C. and 150° C. and more usually between about 20° C. and 40° C.

The co-catalyst may be any mercury salt of an inorganic acid; examples of suitable salts are mercuric chloride, mercuric bromide, mercurous sulfate, mercuric sulfate, mercuric pyrophosphate, mercuric stannate, mercuric pyroantimonate, mercuric pyroarsenate, mercuric orthophosphate, and mercuric tungstate. When used as such it is preferred to charge the mercury salt in the form of small particles. The mercury salt may be deposited on a carrier such as charcoal, silica, etc. The salt may be used in the form of a fixed bed or a fixed-fluid bed or a fluid bed operation with continuous withdrawal of co-catalyst from the system and addition of fresh co-catalyst to the system.

Results obtainable with the process of the instant invention are set out by the following illustrative examples which do not limit the invention.

RUN 1

This run was carried out in a 4 liter carbon steel bomb which was dried by overnight contacting with a stream of hot air at 110° C. The bomb was cooled and 50 grams of mercuric pyrophosphate hydrate was charged along with 500 grams of technical grade n-hexane. Fifty grams of technical boron trifluoride was pressured into the bomb. Then technical grade ethylene was added slowly to the bomb while the bomb and its contents were rocked in a rocker. The ethylene was added until the pressure in the bomb indicated that no more conversion was taking place; 267 grams of ethylene was charged. The bomb was cooled to room temperature opened and the hexane solution withdrawn. The mercuric pyrophosphate hydrate was coated with a sticky viscous material. The hexane was distilled from the higher boiling material to obtain a yield of hexane soluble polymeric material boiling in the $C_7$ and higher range. The solid co-catalyst was dissolved in aqua regia in order to recover the hexane insoluble polymer. Some solid polymer was lost in this work-up. The solid polymeric material recovered from the co-catalyst had a bromine number of 8. The particular operating data and yields for this run are set out below.

| | |
|---|---|
| Temperature, ° C | 35–45 |
| Reaction time, total, hrs | 4 |
| Pressure range, p.s.i.g | 235–400 |
| Ethylene/$BF_3$ (weight) | 5.2 |
| Ethylene converted, percent | 100 |
| Yields (weight percent on ethylene converted): | |
| Hexane soluble ($C_7+$) | 77 |
| Solid from catalyst | 23 |

RUN 2

In this run 300 grams of anhydrous mercuric chloride was charged to a dry 5 liter carbon steel reactor provided with a propeller stirrer. The salt was finely powdered. 2.5 liters of technical grade n-hexane was charged to the reactor and 94 grams of $BF_3$ was pressured into the reactor while the contents were stirred. Reactor temperature was brought up to 110° C. where the pressure was 193 p.s.i. Ethylene was added rapidly to the reactor to reach a pressure of 300 p.s.i. Increments of ethylene were added over a period of 7 hours maintaining the reactor pressure at 300 p.s.i. Seven hundred forty five grams of ethylene was added overall. After an additional half hour of stirring the liquid was withdrawn from the reactor into crushed ice. The mercuric chloride particles in the reactor were covered with a coat of solid polymeric material.

The coated solid co-catalyst was placed in an extractor and extracted overnight with boiling hexane. Then the extracted co-catalyst was further extracted with three portions of benzene. The hexane and benzene extracts were combined and the solvents distilled away to leave a viscous material.

The hexane solution originally removed from the reactor was distilled to remove the hexane. The higher boiling material was fractionated carefully to obtain several cuts. All of these cuts had a bromine number of 75–85. The polymer recovered from the catalyst had a bromine number of 59. The weight percent yield of total polymer based on ethylene charged was about 80%. The percentage of total polymer recovered from the hexane diluent and from the catalyst are set out below.

Polymer: Suitable in reaction mixture— Wt. percent
   173–202° C. boiling range_____ 7
   202–233° C._____ 13
   233–248° C._____ 9
   248° C.+_____ 58
Polymer: Deposited on catalyst_____ 13

TABLE I
Various Mercuric Salt Hydrates in Conjunction With $BF_3$

| Run No. | 3 | 4 | 5 | 6 | 7 | 8 | 9 | 10 | 11 |
|---|---|---|---|---|---|---|---|---|---|
| Salt Anion | Pyrophosphate | Stannate | Pyroantimonate | Pyroarsenate | Aluminosilicate | Tripolyphosphate | Orthophosphate | Arsenate | Tungstate |
| Yields (i-$C_4$ Soluble product only): | | | | | | | | | |
| i-$C_5$ | 0 | 15 | 27 | | 36 | 0 | 5 | 15 | 0 |
| $C_6$ | 1 | 7 | 22 | | 0 | 4 | 0 | 3 | 0 |
| $C_7$+ | 80 | 47 | 93 | | 37 | 85 | 60 | 38 | 33 |
| Total $C_5$ free | 81 | 54 | 115 | | 37 | 89 | 60 | 41 | 33 |
| Ethylene Converted | 100 | 100 | 90 | 100 | 61 | 100 | 100 | 100 | 100 |

RUNS 3–11

Several mercuric salt hydrates were tested in a rocking bomb using a mixture of ethylene and isobutane as the charge. To each run was charged 90 grams of a particular mercury salt, 1 kilogram ethylene-isobutane blend, and 90 grams of $BF_3$, in that order. This gave an isobutane/ethylene mol ratio of 3, a total hydrocarbon charge/salt weight ratio of 11.5 and an ethylene/$BF_3$ weight ratio of 1.4. In all cases the initial temperature of the bomb was between 20° and 30° C. Upon mixing of the contents of the bomb, an immediate temperature rise was observed. In some cases, temperatures as high as about 100° C. were noted. No effort was made to control temperature in these runs. After rocking 20 hours the liquid contents of the bomb were removed and analyzed for materials boiling in the pentane, hexane, $C_7$ and higher boiling materials. The amount of ethylene converted was determined by a combination of analysis of the non-condensible gas and the pressure behavior of the bomb. In all cases the co-catalyst particles were covered with a layer of very viscous semi-solid material.

The results of these tests are set out in Table I. The various runs show that the polymerization powers of the different catalyst systems vary with the particular mercuric salt present. Thus in Run No. 6 mercuric pyroarsenate showed that no isobutane soluble material had been produced; all of the product was recovered as a deposit on the salt. Examinaton of the liquid materials produced show that the major portion of the ethylene had produced a polymer rather than an alkylate through reaction with isobutane.

The salt of Run No. 7 was prepared by treating a molecular sieve to replace the calcium ion content with mercuric ion; this mercuric aluminosilicate contained about 13% of mercury.

TABLE II
Various Anhydrous Mercury Salts in Conjunction With $BF_3$

| Run No. | 12 | 13 | 14 | 15 |
|---|---|---|---|---|
| Salt | $Hg_2SO_4$ | $HgBr_2$ | $HgCl_2$ | $HgCl_2$ |
| Yields (i-$C_4$ Soluble product only): | | | | |
| i-$C_5$ | 18 | 3 | 4 | 24 |
| $C_6$ | 35 | 6 | 0 | 0 |
| $C_7$+ | 59 | 115 | 82 | 70 |
| Total $C_5$ free | 94 | 121 | 82 | 70 |
| Ethylene Converted | 96 | 98 | 100 | 100 |
| Charge (gms.): | | | | |
| Salt | 90 | 40 | 40 | 100 |
| $BF_3$ | 97 | 60 | 18 | 2 |
| Ethylene | 132 | 141 | 146 | 140 |

RUNS 12–15

Several anhydrous mercury salts were tested in a rocking bomb using the procedure described for Runs 3–11 with the exception that the amounts of $BF_3$ and salt used were varied.

The results of these tests are set out in Table II. These results show that the anhydrous salts had polymerizing powers about equal to those of the hydrated salts. Run 15 indicates the effectiveness of even a very small amount of $BF_3$ in conjunction with the mercury salt co-catalyst.

Thus having described the invention, what is claimed is:

1. An ethylene polymerization process comprising contacting ethylene, in admixture with an inert low boiling paraffinic hydrocarbon, with a catalyst system consisting essentially of $BF_3$ and a mercury salt of an inorganic acid, the amount of $BF_3$ present being controlled to provide a catalytically effective amount of free-$BF_3$ in addition to that taken up by said salt, said contacting being carried out at a temperature between about 0° C. and 150° C., at super-atmospheric pressure and for a time sufficient to convert a major proportion of said ethylene to polymeric material and wherein the weight ratio of said ethylene charge to said salt is between about 1 and 10 and the weight ratio of said ethylene charge to said free-$BF_3$ is between about 1 and 100.

2. The process of claim 1 wherein said salt is mercuric pyroarsenate.

3. The process of claim 1 wherein said salt is mercuric pyrophosphate.

4. The process of claim 1 wherein said salt is mercuric chloride.

5. The process of claim 1 wherein said salt is mercuric arsenate.

6. The process of claim 1 wherein said salt is mercuric tungstate.

7. The process of claim 1 wherein said temperature is between about 20° C. and 40° C.

8. The process of claim 1 wherein said inert hydrocarbon is hexane.

References Cited in the file of this patent

UNITED STATES PATENTS

| | | |
|---|---|---|
| 2,085,535 | Langedijk et al. | June 29, 1937 |
| 2,824,150 | Knight et al. | Feb. 18, 1958 |
| 2,824,151 | Kelly et al. | Feb. 18, 1958 |